(12) United States Patent
Wynn

(10) Patent No.: US 10,366,042 B2
(45) Date of Patent: Jul. 30, 2019

(54) MOBILE COMPUTING DEVICE AND METHOD OF TRANSMITTING DATA THEREFROM

(71) Applicant: The Boeing Company, Chicago, IL (US)

(72) Inventor: Bradley Shawn Wynn, Reston, VA (US)

(73) Assignee: The Boeing Company, Chicago, IL (US)

(*) Notice: Subject to any disclaimer, the term of this patent is extended or adjusted under 35 U.S.C. 154(b) by 58 days.

(21) Appl. No.: 15/832,165

(22) Filed: Dec. 5, 2017

(65) Prior Publication Data

US 2018/0095928 A1 Apr. 5, 2018

Related U.S. Application Data

(62) Division of application No. 14/025,521, filed on Sep. 12, 2013, now Pat. No. 9,892,087.

(51) Int. Cl.
*G06F 13/00* (2006.01)
*G06F 13/42* (2006.01)
*G06F 13/40* (2006.01)

(52) U.S. Cl.
CPC ...... *G06F 13/4286* (2013.01); *G06F 13/4072* (2013.01)

(58) Field of Classification Search
CPC .... G06F 13/385; G06F 13/102; G06F 9/4411; G06F 13/42; G06F 13/4286; G06F 2213/0004; G06F 13/38; G06F 13/14

USPC ....... 710/300, 302, 304, 110, 305, 313, 316, 710/16, 18
See application file for complete search history.

(56) References Cited

U.S. PATENT DOCUMENTS

| | | | | |
|---|---|---|---|---|
| 5,566,193 A | * | 10/1996 | Cloonan | G06F 11/10 708/530 |
| 6,836,814 B2 | | 12/2004 | Takaoka et al. | |
| 7,307,912 B1 | * | 12/2007 | Vernenker | G11C 7/1006 365/154 |
| 8,176,214 B2 | | 5/2012 | Jones et al. | |

(Continued)

FOREIGN PATENT DOCUMENTS

| CN | 102750252 A | 10/2012 |
|---|---|---|
| CN | 203167074 U | 8/2013 |

(Continued)

OTHER PUBLICATIONS

Electrical Impedance, <https://en.wikipedia.org/wiki/Electrical_impedance>, accessed Jun. 16, 2016.

(Continued)

*Primary Examiner* — Tim T Vo
*Assistant Examiner* — Kim T Huynh
(74) *Attorney, Agent, or Firm* — Armstrong Teasdale LLP

(57) ABSTRACT

A mobile computing device is provided. The device includes a first port having a pinout configuration that is configured to support at least one data format, a data source configured to provide data of a second data format that is different from the at least one data format, and a first multiplexer configured to selectively direct data from the data source towards the first port. The pinout configuration is modified to enable the first port to support the second data format.

20 Claims, 6 Drawing Sheets

(56) References Cited

U.S. PATENT DOCUMENTS

| | | | |
|---|---|---|---|
| 8,224,170 B2 | 7/2012 | King et al. | |
| 8,601,173 B2 | 12/2013 | Sung et al. | |
| 8,683,087 B2 | 3/2014 | Connolly et al. | |
| 8,799,527 B2 | 8/2014 | Mullins et al. | |
| 2005/0015525 A1 | 1/2005 | Cahill et al. | |
| 2005/0177661 A1 | 8/2005 | Loo | |
| 2005/0246477 A1 | 11/2005 | Adams et al. | |
| 2007/0082634 A1 | 4/2007 | Thijssen et al. | |
| 2009/0063694 A1 | 3/2009 | Foo et al. | |
| 2009/0108848 A1 | 4/2009 | Lundquist et al. | |
| 2009/0248924 A1* | 10/2009 | Melin | G09G 5/006 710/63 |
| 2009/0307392 A1* | 12/2009 | Mychalowych | G06F 13/4045 710/51 |
| 2010/0049895 A1 | 2/2010 | Liang | |
| 2010/0295960 A1 | 11/2010 | Furlan et al. | |
| 2011/0016334 A1 | 1/2011 | Tom et al. | |
| 2011/0055407 A1 | 3/2011 | Lydon et al. | |
| 2011/0125930 A1* | 5/2011 | Tantos | G06F 13/385 710/8 |
| 2011/0151860 A1 | 6/2011 | Yu | |
| 2012/0011293 A1* | 1/2012 | Cheng et al. | G06F 13/00 710/303 |
| 2012/0066422 A1 | 3/2012 | Monks | |
| 2012/0203937 A1 | 8/2012 | Mohanty et al. | |
| 2013/0073758 A1 | 3/2013 | Chang et al. | |
| 2013/0179603 A1 | 7/2013 | Tu et al. | |
| 2013/0179609 A1 | 7/2013 | Bhesania et al. | |
| 2013/0290590 A1 | 10/2013 | Chiang et al. | |
| 2013/0336334 A1* | 12/2013 | Gilbert | H04J 3/16 370/458 |
| 2015/0032917 A1 | 1/2015 | Nguyen | |
| 2016/0012000 A1 | 1/2016 | Paramasivam et al. | |

FOREIGN PATENT DOCUMENTS

| | | |
|---|---|---|
| GB | 2473123 A | 3/2011 |
| JP | 2012147441 A | 8/2012 |
| JP | 2013512510 A | 4/2013 |
| RU | 2454021 C2 | 6/2012 |
| WO | 2011158310 A1 | 12/2011 |

OTHER PUBLICATIONS

Portable Digital Media Interface (PDMI), <https://en.wikipedia.org/wiki/PDMI>, accessed on Jun. 16, 2016.
International Search Report and Written Opinion for related application PCT/US2014/045092 dated Sep. 29, 2014; 8 pp.
International Preliminary Report on Patentability for related application PCT/US2014!045092 dated Mar. 24, 2016; 5 pp.
Taiwanese Office Action for related application 103120992, 5 pp.
RU Office Action for related application 2016106576/08 dated Apr. 18, 2018; 25 pp.
China Office Action and Search Report for related application 2014800499910 dated Mar. 15, 2018; 20 pp.
JP Office Action for related application 2016-541962 dated Jun. 18, 2018; 17 pp.
Extended European Search Report re Application No. 18195421.2-1221 dated Feb. 12, 2019; pp. 1-38.

* cited by examiner

| PDMI: 2-lane DisplayPort pinout ||||
|---|---|---|---|
| Pin No. | Pin Name | Interface Grouping | Pin Description |
| 1 | USB 5V | USB 2.0 Interface | USB Power (VBUS) |
| 2 | USB DGND | | USB Ground |
| 3 | USB D+ | | Data + |
| 4 | USB OTG | | On-The-Go |
| 5 | USB D- | | Data - |
| 6 | HC 5V | High Current Power (Output on Host) | High current 5V supply (1.8A, or 3.6A if combined with pin 15) |
| 7 | VDET | Video Mode Detect | Video Mode Detect = Open |
| 8 | AUDIO RIGHT OUT | Analog Audio (Input on Host) | Right Audio Out |
| 9 | AUDIO LEFT OUT | | Left Audio Out |
| 10 | AUDIO OUT GND | | Audio output ground |
| 11 | CONFIG2 | CEC | |
| 12 | SSR- | USB 3.0 Data Device Receive | USB 3.0 SSRX- signal |
| 13 | GND | | Signal Ground |
| 14 | SSR+ | | USB 3.0 SSRX+ signal |
| 15 | HC 5V | High Current Power (Output from Host) | High current 5V supply (1.8A, or 3.6A if combined with pin 6) |
| 16 | HC GND | | High current Ground |
| 17 | SST- | USB 3.0 Data Device Transmit | USB 3.0 SSTX- signal |
| 18 | GND | | Signal Ground |
| 19 | SST+ | | USB 3.0 SSTX+ signal |
| 20 | HPD | DisplayPort v1.1a Interface, 2 Lane (Host is Sink, Device is Source) | Hot Plug Detect |
| 21 | DAUX+ | | AUX Channel + |
| 22 | DAUX- | | AUX Channel - |
| 23 | AP | | 3.3V DisplayPort Power (Power from portable device) |
| 24 | D1- | | Main Link Lane 1 (-) |
| 25 | GND | | Signal Ground |
| 26 | D1+ | | Main Link Lane 1 (+) |
| 27 | CONFIG1 | | (was Signal Ground) |
| 28 | D0- | | Main Link Lane 0 (-) |
| 29 | GND | | Signal Ground |
| 30 | D0+ | | Main Link Lane 0 (+) |

FIG. 5

| PDMI: HDMI Mode pinout | | | |
|---|---|---|---|
| Pin No. | Pin Name | Interface Grouping | Pin Description |
| 1 | USB 5V | USB 2.0 Interface | USB Power (VBUS) |
| 2 | USB DGND | | USB Ground |
| 3 | USB D+ | | Data + |
| 4 | USB OTG | | On-The-Go |
| 5 | USB D- | | Data - |
| 6 | HC 5V | High Current Power (Output on Host) | High current 5V supply (1.8A, or 3.6A if combined with pin 15) |
| 7 | VDET | Video Mode Detect | Video Mode Detect = GND |
| 8 | AUDIO RIGHT OUT | Analog Audio (Input on Host) | Right Audio Out |
| 9 | AUDIO LEFT OUT | | Left Audio Out |
| 10 | AUDIO OUT GND | | Audio output ground |
| 11 | CEC | HDMI Interface | Consumer Electronic Control |
| 12 | Clock- | | TMDS Clock- |
| 13 | GND | | Signal Ground |
| 14 | Clock+ | | TMDS Clock+ |
| 15 | HC 5V | High Current Power (Output from Host) | High current 5V supply (1.8A, or 3.6A if combined with pin 6) |
| 16 | HC GND | | High current Ground |
| 17 | Data0- | HDMI Interface (Host is Sink, Device is Source) | TMDS Data0- |
| 18 | GND | | Signal Ground |
| 19 | Data0+ | | TMDS Data0+ |
| 20 | HPD / HEAC+ | | Hot Plug Detect / HEAC+ |
| 21 | SCL | | I2C serial clock for DDC |
| 22 | SDA | | I2C serial data for DDC |
| 23 | +5V | | +5V power (max 50mA) |
| 24 | Data1- | | TMDS Data1- |
| 25 | GND | | Signal Ground |
| 26 | Data1+ | | TMDS Data1+ |
| 27 | UTIL / HEAC- | | |
| 28 | Data2- | | TMDS Data2- |
| 29 | GND | | Signal Ground |
| 30 | Data2+ | | TMDS Data2+ |

FIG. 6

| PDMI: 4-lane DisplayPort pinout ||||
|---|---|---|---|
| Pin No. | Pin Name | Interface Grouping | Pin Description |
| 1 | USB 5V | USB 2.0 Interface | USB Power (VBUS) |
| 2 | USB DGND | | USB Ground |
| 3 | USB D+ | | Data + |
| 4 | USB OTG | | On-The-Go |
| 5 | USB D- | | Data - |
| 6 | HC 5V | High Current Power (Output on Host) | High current 5V supply (1.8A, or 3.6A if combined with pin 15) |
| 7 | VDET | Video Mode Detect | Video Mode Detect = 3.3V |
| 8 | AUDIO RIGHT OUT | Analog Audio (Input on Host) | Right Audio Out |
| 9 | AUDIO LEFT OUT | | Left Audio Out |
| 10 | AUDIO OUT GND | | Audio output ground |
| 11 | CONFIG2 | DisplayPort v1.1a Interface, 4-Lane | |
| 12 | D3- | | Main Link Lane 3 (-) |
| 13 | GND | | Signal Ground |
| 14 | D3+ | | Main Link Lane 3 (+) |
| 15 | HC 5V | High Current Power (Output from Host) | High current 5V supply (1.8A, or 3.6A if combined with pin 6) |
| 16 | HC GND | | High current Ground |
| 17 | D2- | DisplayPort v1.1a Interface, 4-Lane (Host is Sink, Device is Source) | Main Link Lane 2 (-) |
| 18 | GND | | Signal Ground |
| 19 | D2+ | | Main Link Lane 2 (+) |
| 20 | HPD | | Hot Plug Detect |
| 21 | DAUX+ | | AUX Channel + |
| 22 | DAUX- | | AUX Channel - |
| 23 | AP | | 3.3V DisplayPort Power (Power from portable device) |
| 24 | D1- | | Main Link Lane 1 (-) |
| 25 | GND | | Signal Ground |
| 26 | D1+ | | Main Link Lane 1 (+) |
| 27 | CONFIG1 | | |
| 28 | D0- | | Main Link Lane 0 (-) |
| 29 | GND | | Signal Ground |
| 30 | D0+ | | Main Link Lane 0 (+) |

FIG. 7

MOBILE COMPUTING DEVICE AND METHOD OF TRANSMITTING DATA THEREFROM

CROSS REFERENCE TO RELATED APPLICATIONS

This application is a divisional application of U.S. patent application Ser. No. 14/025,521, filed Sep. 12, 2013, which is incorporated by reference herein in its entirety.

BACKGROUND

The field of the present disclosure relates generally to mobile computing devices and, more specifically, to hardware that facilitates increasing the functionality of a mobile computing device.

Mobile computing devices, such as smartphones, cellular phones, and personal digital assistants (PDAs), have grown in use and popularity among a variety of different types of users. At least some known mobile computing devices use a cable medium to transfer data between the mobile computing device and other electronic devices. Generally, connectors that are coupled to opposing ends of the cable medium and docking ports defined in the mobile computing device support predetermined standard protocols that enable data to be transferred therebetween. More specifically, the connectors and docking ports include a pinout that is arranged in a predetermined configuration to support the standard protocols. Exemplary standard protocols include universal serial bus (USB), firewire (IEEE 1394), high-definition multimedia interface (HDMI), DisplayPort (e.g., 2-Lane and 4-Lane), and portable digital media interface (PDMI).

The functionality of at least some known mobile computing devices is based at least partially on the amount and types of docking ports included in the mobile computing device. For example, a mobile computing device will generally have a dedicated USB docking port and a dedicated HDMI docking port to support USB and HDMI functionality. Further, at least some known docking ports support multiple functionalities. For example, a docking port that supports the PDMI standard protocol has both 2-Lane DisplayPort and USB functionality. Increasing the functionality of a mobile computing device is becoming increasingly important to those in the electronics industry. As such, it may be desirable to modify the pinout configuration of an existing docking port to facilitate increasing the functionality of a mobile computing device.

BRIEF DESCRIPTION

In one aspect, a mobile computing device is provided. The device includes a first port configured with a first pinout to support a first data format, a data source configured to provide data in a second data format different from the first data format, and a first multiplexer configured to selectively transmit data from the data source to the first port. The first port is reconfigured with a second pinout to support the second data format.

In another aspect, a method of transmitting data from a mobile computing device is provided. The method includes selecting a data source from which to provide data to a first port in the mobile computing device, wherein the first port is configured with a first pinout to support a first data format and the data source is configured to transmit data in a second data format that is different from the first data format. The method also includes selectively transmitting the data in the second data format to the first port, reconfiguring the first pinout with a second pinout that enables the first port to support the second data format, and transmitting the data in the second data format through the first port.

In yet another aspect, a mobile computing device is provided. The device includes a first port comprising a first pinout that is configured to support a portable digital media interface, a plurality of data sources that are each configured to provide data in a data format, wherein a bias is selectively asserted on a first pin of said first port to facilitate selecting the data format to transmit to the first port from one of the plurality of data sources, and a multiplexer configured to selectively transmit data from the one of the plurality of data sources to the first port, wherein the first pinout is reconfigured with a second pinout to support the selected data format.

BRIEF DESCRIPTION OF THE DRAWINGS

FIG. 5 illustrates an alternative exemplary pinout for a docking port shown in FIG. 1 in the first operational mode.

FIG. 6 illustrates an alternative exemplary pinout for a docking port shown in FIG. 1 in the second operational mode.

FIG. 7 illustrates an alternative exemplary pinout for a docking port shown in FIG. 1 in the third operational mode.

DETAILED DESCRIPTION

The implementations described herein relate to devices and methods that may be used to transmit data to and/or from a mobile computing device. In the exemplary implementation, the mobile computing device uses hardware-based switching mechanisms to direct data from a data source to more than one docking port in the mobile computing device. For example, the switching mechanisms facilitate selectively transmitting data of a predetermined data format either to a first docking port that supports the predetermined data format or a second docking port that may be reconfigured to support the predetermined data format. More specifically, the pinout of the second docking port may be reconfigured to support the predetermined data format. As such, the switching mechanisms facilitate increasing the functionality of the mobile computing device.

Figure 1:
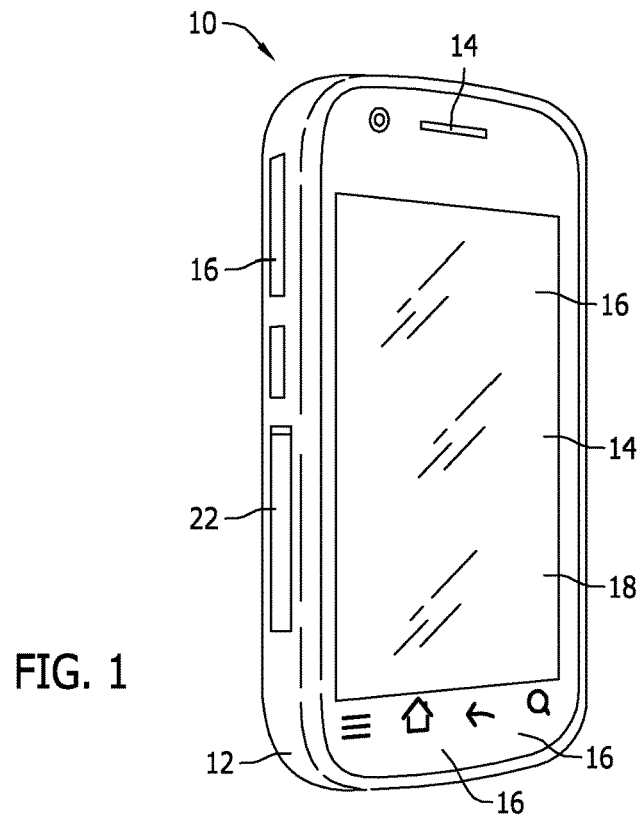
FIG. 1 is a front perspective view of an exemplary mobile computing device.
Figure 2:
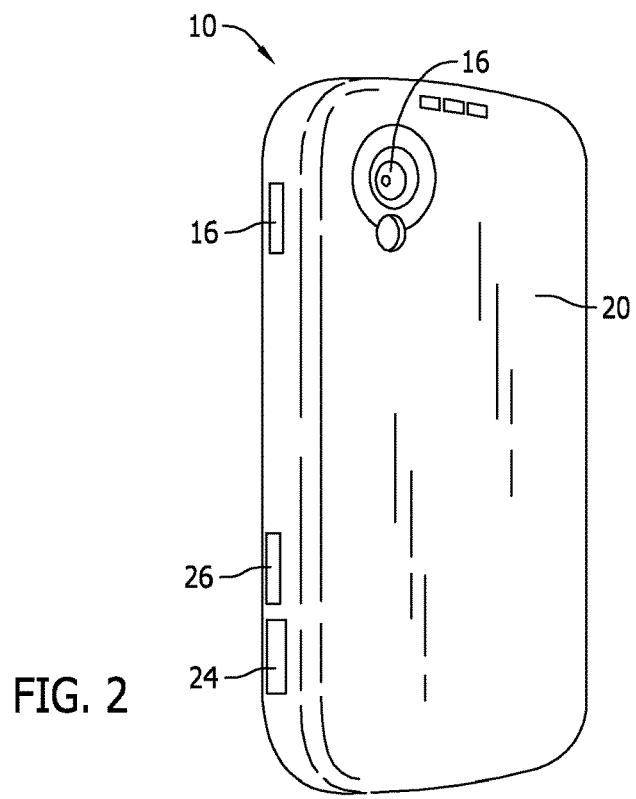
FIG. 2 is a back perspective view of the mobile computing device shown in FIG. 1.

FIGS. 1 and 2 illustrate an exemplary mobile computing device 10. In the exemplary implementation, mobile computing device 10 is provided for supporting communication with another device, such as another mobile computing device and/or an electronic display device. Moreover, mobile computing device 10 may include a variety of other functionalities, including network access, SMS messaging, hosting of one or more applications, data processing, encryption, and/or other functions. In the exemplary implementation, mobile computing device 10 is a smartphone, configured to communicate through one or more cellular networks.

As shown, mobile computing device 10 includes a housing 12 and multiple presentation devices 14 disposed at least partially within housing 12. Presentation device 14 outputs information such as, but not limited to, data related to operation of mobile computing device 10, commands, requested data, messages, one or more input devices (such as, a virtual keyboard), and/or any other type of data to a user. In several examples, presentation device 14 may include, for example, a liquid crystal display (LCD), a light-emitting diode (LED) display, a light-emitting diode (LED), a camera flash, an organic LED (OLED) display, and/or an "electronic ink" display. Multiple presentation devices 14 may be included to present data to a user visually and/or audibly, and presentation device 14 may include an audio output for use in voice communication.

Mobile computing device 10 further includes multiple input devices 16 disposed at least partially within housing 12. Each input device 16 may be configured to receive selections, requests, commands, information, data, and/or any other type of inputs, according to one or more of the methods and/or processes described herein. Input devices 16 may include, for example, buttons, a keyboard, a microphone, a pointing device, a stylus, a touch sensitive panel (e.g., a touch pad or a touch screen), a gyroscope, an accelerometer, a digital compass, a position detector, a camera, a second camera, and/or an audio input interface. A single component, such as a touch screen 18, may function as both presentation device 14 and input device 16.

Mobile computing device 10 also includes multiple docking ports disposed at least partially within housing 12 and that support a predetermined standard protocol. As such, each docking port supports at least one data format for use in transmitting data to and/or from mobile computing device 10. In the exemplary implementation, mobile computing device 10 includes a portable digital media interface (PDMI) port 22, a Universal Serial Bus (USB) port 24, and a high-definition multimedia interface (HDMI) port 26.

Mobile computing device 10 includes a back panel 20 engaged with housing 12. Back panel 20 defines a cross-section substantially consistent with housing 12, thereby forming a substantially integral unit with housing 12 when coupled thereto. Back panel 20 is removable from mobile computing device 10 to provide access to one or more aspects of mobile computing device 10.

Figure 3:
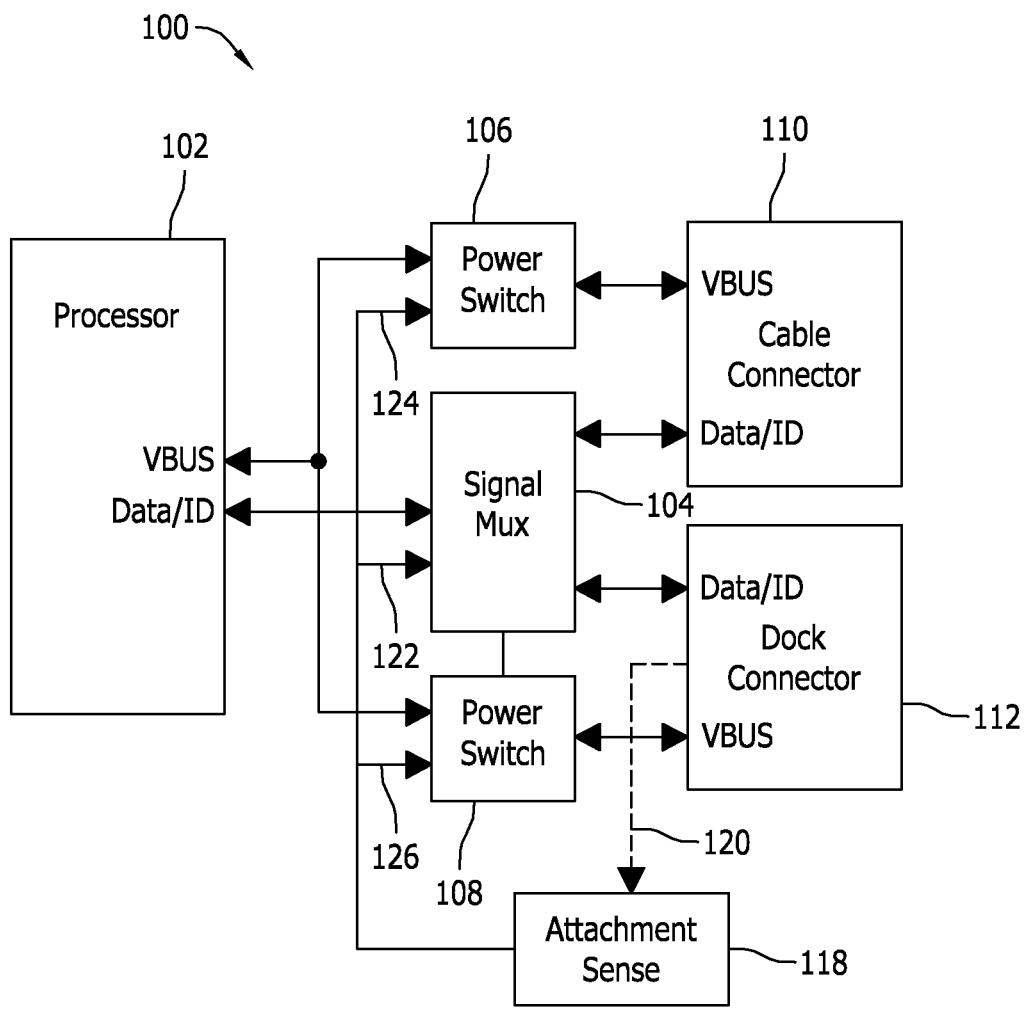
FIG. 3 is a schematic illustration of an exemplary hardware architecture that may be used with the mobile computing device shown in FIG. 1.

FIG. 3 is a schematic illustration of an exemplary hardware architecture 100 that may be used with mobile computing device 10. In the exemplary implementation, hardware architecture 100 includes a processor 102, a multiplexer 104, and multiple power switches 106 and 108. Multiplexer 104 and power switches 106 and 108 are each coupled in communication with processor 102. Hardware architecture 100 also includes a first docking port 110 that supports the USB standard protocol and a second docking port 112 that supports the PDMI standard protocol. In an alternative implementation, first docking port 110 and second docking port 112 may be configured to support any standard protocol.

Processor 102 may include one or more processing units (e.g., in a multi-core configuration). Further, processor 102 may be implemented using one or more heterogeneous processor systems in which a main processor is present with secondary processors on a single chip. As another illustrative example, processor 102 may be a symmetric multi-processor system containing multiple processors of the same type. Further, processor 102 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Multiplexer 104 sends and receives data frames between processor 102, first docking port 110, and second docking port 112, and may be used as both a multiplexer and a demultiplexer. More specifically, multiplexer 104 is configured to split a data frame into multiple data frames and configured to combine multiple data frames into one data frame. In some implementations, multiplexer 104 is configured to act as a switch in that multiplexer 104 is configured to route data frames through a particular channel (not shown) based on a desired or predetermined destination.

An attachment sensor 118 is coupled in communication with second docking port 112, multiplexer 104, and power switches 106 and 108. More specifically, attachment sensor 118 is coupled in communication with second docking port 112 via a sensing line 120, and is coupled in communication with multiplexer 104 via a command line 122, power switch 106 via a command line 124, and power switch 108 via a command line 126. Attachment sensor 118 may be implemented as a hardware circuit including custom very large scale integration ("VLSI") circuits or gate arrays, off-the-shelf semiconductors such as logic chips, transistors, or other discrete components. Attachment sensor 118 may also be implemented in programmable hardware devices such as field programmable gate arrays (FPGAs), programmable array logic, and/or programmable logic devices (PLDs).

Power switches 106 and 108 are coupled in communication between processor 102 and first and second docking ports 110 and 112. More specifically, first power switch 106 is coupled between processor 102 and first docking port 110, and second power switch 108 is coupled between processor 102 and second docking port 112. Power switches 106 and 108 may be fabricated from field effect transistors (FET), such as metal oxide semiconductor field effect transistors (MOSFET), bipolar transistors, such as insulated gate bipolar transistors (IGBT), bipolar junction transistors (BJT), and gate turn-off thyristors (GTO).

Power switches 106 and 108 facilitate routing USB power into and/or out of a selected docking port. As such, a corner condition may be mitigated by enabling hardware architecture 100 to allow the standard USB method of port detection to have continued functionality. Further, power switches 106 and 108 operate independently from processor 102 because processor 102 would not be operable when mobile computing device 10 is off. As such, the charging function of the USB connection continues to work even when mobile computing device 10 is off and/or if mobile computing device 10 has a low battery.

In operation, mobile computing device 10 is in a first operational mode when an interface connector is disconnected from second docking port 112, and is in a second operational mode when an interface connector couples with second docking port 112. More specifically, the second operational mode may be actuated when attachment sensor 118 detects a bias asserted on second docking port 112 via sensing line 120. For example, in one implementation, a sink device (e.g., a monitor) (not shown) may assert a non-zero voltage on at least one pin of second docking port 112 to request data to be transmitted through second docking port 112. In an alternative implementation, the sink device may ground the at least one pin to request to receive data.

Upon detection of the bias asserted on second docking port 112, attachment sensor 118 directs multiplexer 104 to transmit data from processor 102 towards second docking port 112. More specifically, multiplexer 104 is configured to route data based on a command received from attachment sensor 118 via command line 122. Attachment sensor 118 may also direct, via command lines 124 and 126, power switches 106 and 108 to channel power from processor 102 to second docking port 112.

Figure 4:
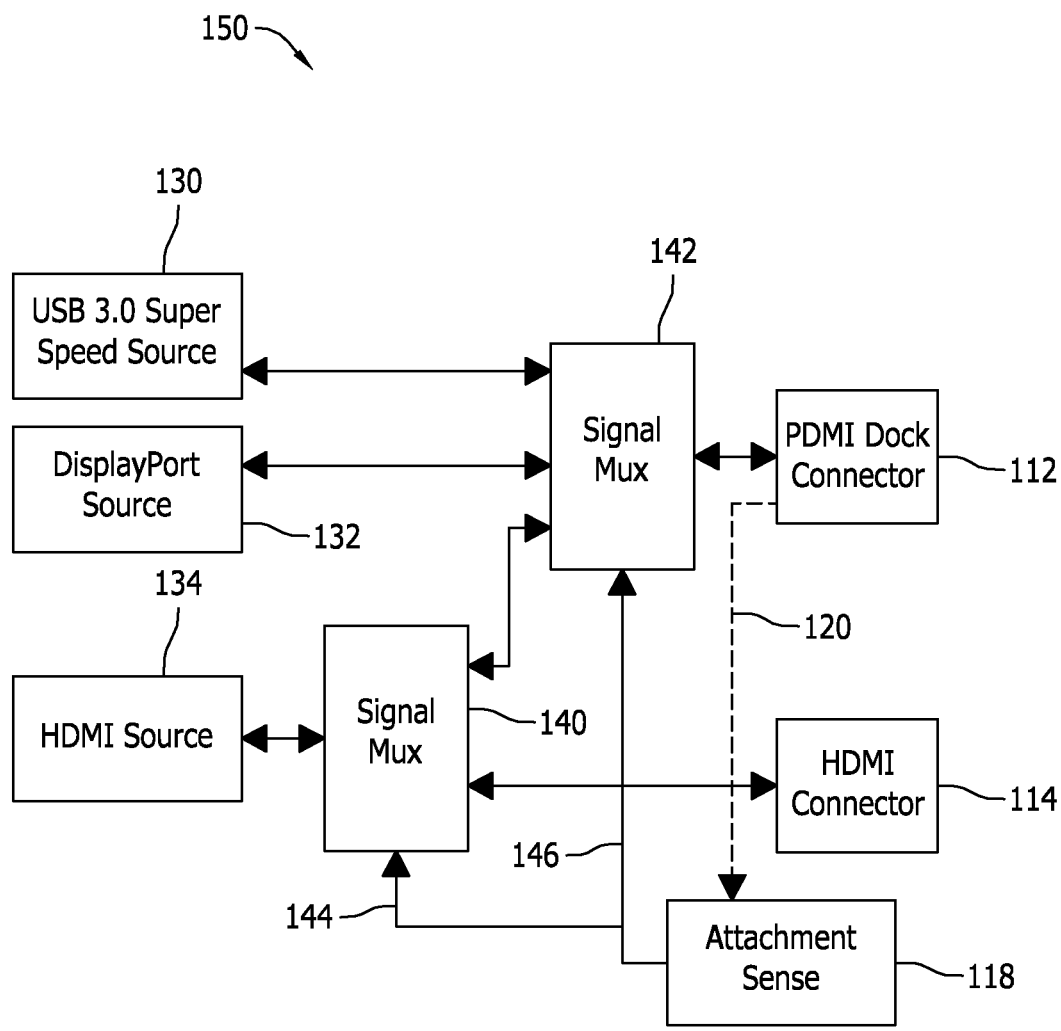
FIG. 4 is a schematic illustration of an alternative exemplary hardware architecture that may be used with the mobile computing device shown in FIG. 1.

FIG. 4 is a schematic illustration of an alternative exemplary hardware architecture 150 that may be used with mobile computing device 10. In the exemplary implementation, hardware architecture 150 includes data sources such as a USB 3.0 Super Speed source (USB source) 130, a DisplayPort source 132, and an HDMI source 134. DisplayPort source 132 and HDMI source 134 produce a desired data and/or video format using processor 102 (shown in FIG. 3) and an interface chip (not shown). In an alternative implementation, the data sources may provide data in any suitable data format that enables mobile computing device 10 to function as described herein.

Hardware architecture 150 also includes second docking port 112 and a third docking port 114 that may each channel data from selected data sources therethrough. Second docking port 112 supports the PDMI standard protocol, and third docking port 114 supports the HDMI standard protocol. In an alternative implementation, second docking port 112 and third docking port 114 may be configured to support any standard protocol.

A first multiplexer 140 and a second multiplexer 142 are located between data sources 130, 132, and 134, and second and third docking ports 112 and 114. First multiplexer 140 sends and receives data frames between HDMI source 134, second multiplexer 142, and third docking port 114, and second multiplexer 142 sends and receives data frames between USB source 130, DisplayPort source 132, first multiplexer 140, and second docking port 112.

Attachment sensor 118 is coupled in communication with second docking port 112, first multiplexer 140, and second multiplexer 142. More specifically, attachment sensor 118 is coupled in communication with second docking port 112 via sensing line 120, is coupled in communication with first multiplexer 140 via a command line 144, and is coupled in communication with second multiplexer 142 a via command line 146.

In operation, mobile computing device 10 is in a first operational mode when an interface connector is disconnected from second docking port 112, and is in a second operational mode when an interface connector couples with second docking port 112. More specifically, the second operational mode may be actuated when attachment sensor 118 detects a bias asserted on second docking port 112 via sensing line 120. For example, in one implementation, a sink device may assert a bias on at least one pin of second docking port 112 to request data and/or video to be transmitted through second docking port 112.

When mobile computing device 10 is in the first operational mode, first multiplexer 140 transmits data from HDMI source 134 towards third docking port 114, and second multiplexer 142 channels data from one of data sources 130 and 132 to second docking port 112. When mobile computing device 10 is in the second operational mode, either first multiplexer 140 transmits data from HDMI source 134 to second docking port 112 or second multiplexer 142 transmits data from DisplayPort source 132 to second docking port 112 at an increased data rate when compared to the first operational mode. Further, as will be explained in greater detail below, the pinout of second docking port 112 may be reconfigured in the second operational mode such that second docking port 112 can support the additional bandwidth supplied from HDMI source 134 and/or DisplayPort source 132.

Multiplexers 140 and 142 are configured to route data based on commands received from attachment sensor 118 via command lines 144 and 146. More specifically, a sink device provides a request to receive data in a selected data format through the connector that interfaces with second docking port 112, and attachment sensor 118 receives the request and directs multiplexers 140 and 142 to transmit the data from HDMI source 134 and/or DisplayPort source 132 to second docking port 112. In such an implementation, the pinout of second docking port 112 is reconfigured with a second pinout to support the HDMI standard protocol and/or the 4-Lane DisplayPort standard protocol.

FIGS. 5, 6, and 7 illustrate exemplary pinouts of second docking port 112 (shown in FIGS. 3 and 4) in first, second, and third operational modes. In the exemplary implementation, the pinout of second docking port 112 (shown in FIGS. 3 and 4) may be reconfigured to enable second docking port 112 to support multiple data formats. For example, the pinout may be reconfigured to enable second docking port 112 to be in first, second, and third operational modes based on a bias detected on at least one pin of second docking port 112. More specifically, second docking port 112 is in the first operational mode when a bias is not detected on one of the pins, second docking port 112 is in the second operational mode when a first bias is detected on one of the pins, and second docking port 112 is in the third operational mode when a second bias is detected on one of the pins. The first bias may be a ground applied to the pin, and the second bias may be a non-zero voltage detected on the pin. Attachment sensor 118 (shown in FIGS. 3 and 4) may detect the first bias and/or the second bias and then command multiplexer 104 (shown in FIG. 3) and/or multiplexers 140 and 142 (shown in FIG. 4) to transmit data from a selected data source to second docking port 112. In an alternative implementation, the first bias and the second bias may be any bias that enables second docking port 112 to function as described herein. Moreover, in an alternative implementation, second docking port 112 may be in the first operational mode when the bias is detected on a first pin, second docking port 112 may be in the second operational mode when the bias is detected on a second pin, and second docking port 112 may be in the third operational mode when the bias is detected on a third pin.

The type of bias and/or the lack thereof detected on pin 7 facilitates determining the data format to transmit to second docking port 112. Referring now to FIG. 5, mobile computing device 10 configures second docking port 112 to operate in the first operational mode when a bias is not detected on pin 7 and upon detection of a bias on pin 10. More specifically, detecting a bias on pin 10 may provide an indication to attachment sensor 118 that a sink device is requesting USB service. Further, leaving pin 7 open may provide an indication to attachment sensor 118 that the sink device is requesting 2-Lane DisplayPort service via pins 20-30. As such, the pinout of second docking port 112 does not need to be reconfigured to facilitate supporting and transmitting the 2-Lane DisplayPort data format therethrough. In an alternative implementation, when a bias is not detected on pin 7 and detecting a bias on pin 10 may provide an indication that the sink device is requesting data in any suitable data format to be transmitted through second docking port 112.

Referring now to FIG. 6, mobile computing device 10 configures second docking port 112 to operate in the second operational mode upon detection of a ground on pin 7 and upon detection of a bias on pin 10. More specifically, detecting a ground on pin 7 and detecting a bias on pin 10 may provide an indication to attachment sensor 118 that a sink device is requesting USB service and/or HDMI service. The pinout may then be modified to support the HDMI data format because second docking port 112 may be unable to support both 2-Lane DisplayPort and HDMI data formats simultaneously. For example, second docking port 112 supports USB 2.0, USB 3.0, and 2-Lane DisplayPort service when in the first operational mode. In the second operational mode, pins 11-14 and pins 17-30 are reallocated from USB 3.0, Consumer Electronic Control, and 2-Lane DisplayPort to enable second docking port 112 to support transmitting the HDMI data format. In an alternative implementation, detecting a ground on pin 7 and detecting a bias on pin 10 may provide an indication that the sink device is requesting data in any suitable data format to be transmitted through second docking port 112.

Referring now to FIG. 7, mobile computing device 10 configures second docking port 112 to operate in the third operational mode upon detection of a non-zero voltage on pin 7 and upon detection of a bias on pin 10. More specifically, detecting a non-zero voltage on pin 7 and detecting a bias on pin 10 may provide an indication to attachment sensor 118 that a sink device is requesting USB service and/or 4-Lane DisplayPort service. The pinout may then be reconfigured to support the 4-Lane DisplayPort data format because second docking port 112 may be unable to support both 2-Lane DisplayPort and 4-Lane DisplayPort data formats simultaneously. For example, second docking port 112 supports USB 2.0, USB 3.0, and 2-Lane DisplayPort service when in the first operational mode. In the third operational mode, pins 11-14 and pins 17-30 are re-allocated from USB 3.0, Consumer Electronic Control, and 2-Lane DisplayPort to enable second docking port 112 to support transmitting the 4-Lane DisplayPort data format. Further, the non-zero voltage is supplied to pin 7 from pin 23 of the pinout configuration. In an alternative implementation, detecting a non-zero voltage on pin 7 and detecting a bias on pin 10 may provide an indication that the sink device is requesting data in any suitable data format to be transmitted through second docking port 112. Further, in an alternative implementation, the non-zero voltage may be supplied from any suitable power source that enables second docking port 112 to function as described herein.

Moreover, in an alternative implementation, any pin of second docking port 112 may be configured to receive the bias and facilitate video mode detection for second docking port 112.

The devices and methods described herein facilitate increasing the functionality of a mobile computing device. More specifically, the devices described herein include a hardware architecture that enables data of a selected data format to be selectively provided to docking ports at least partially disposed in the mobile computing the device. An interface at the docking ports is detected when a sink device asserts a bias on the ports, and the pinout of one of the ports may be reconfigured to support the selected data format. As such, the mobile computing device described herein includes docking ports that are compatible with popular connectors used by consumers, and a docking port that may be reconfigured to have increased functionality and to transmit multiple data formats therethrough.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile computing device comprising:
a first port configured with a first pinout to support a first data format and a second pinout to support a second data format, wherein the first data format is different from the second data format;
a first data source configured to provide data in the first data format;
a second data source configured to provide data in the second data format;
a first multiplexer connected to the first data source; and
a second multiplexer connected to the second data source, the first multiplexer, and the first port,
wherein the first multiplexer is configured to selectively transmit data from the first data source to the second multiplexer, and
wherein the second multiplexer is configured to selectively transmit data to the first port from one of the second data source and an output from the first multiplexer that includes data in the first data format.

2. The device in accordance with claim 1, wherein the first port comprises a portable digital media interface (PDMI) port.

3. The device in accordance with claim 1, wherein the first data format and the second data format is one of a universal serial bus (USB) data format, a high-definition multimedia interface (PDMI) data format, and a 4-Lane DisplayPort data format.

4. The device in accordance with claim 1 further comprising a second port configured with a third pinout to support the first data format wherein the second port is connected to the first multiplexer.

5. The device in accordance with claim 4 further comprising a hardware sensor configured to detect a bias asserted on the first port and configured to command the first multiplexer and the second multiplexer to selectively transmit the data in the second data format to the first port based, at least in part, on the detected bias.

6. The device in accordance with claim 5, wherein the bias is asserted on at least one pin of the first port to facilitate selecting the data format to be transmitted to the first port.

7. The device in accordance with claim 5, wherein the first multiplexer transmits data in the first data format to the second port when a bias is not detected, and transmits data in the first data format to the first port when the bias is detected.

8. The device in accordance with claim 1, wherein the first port is reconfigured with a third pinout, wherein the third pinout supports additional bandwidth for one of the first data format and the second data format.

9. A method of transmitting data from a mobile computing device, the method comprising:
selectively transmitting data from a first data source to a first port in the mobile computing device, wherein the first port is configured with a first pinout to support a first data format, and wherein the first data source provides data in the first data format;

selecting a second data source from which to provide data to the first port in the mobile computing device, wherein the second data source is configured to transmit data in a second data format that is different from the first data format;

reconfiguring the first port with a second pinout that enables the first port to support the second data format;

receiving at a first multiplexer, data in the first data format from the first data source;

selectively transmitting data in the first data format from the first multiplexer to a second multiplexer; and selectively transmitting data by the second multiplexer to the first port from one of the second data source configured to provide data in the second data format and an output of the first multiplexer that includes data in the first data format.

10. The method in accordance with claim 9, wherein selecting a second data source comprises detecting a bias on at least one pin of the first port.

11. The method in accordance with claim 10, wherein detecting a bias comprises detecting at least one of a ground and a non-zero voltage on the at least one pin, the second data source selected based on the bias asserted on the at least one pin.

12. The method in accordance with claim 11, wherein detecting a non-zero voltage comprises detecting the non-zero voltage that is supplied to the at least one pin of the first port.

13. The method in accordance with claim 10 further comprising selecting a default data source when a bias is not detected on the at least one pin.

14. The method in accordance with claim 9, wherein reconfiguring the first port comprises allocating at least one pin of the first pinout to support the second data format.

15. The method in accordance with claim 9, further comprising:

detecting, by a hardware sensor, the second pinout in the first port; and transmitting, by the hardware sensor directly via a command line, commands to the first multiplexer and the second multiplexer to selectively transmit data from the second data source to the first port, wherein the hardware sensor is coupled to the first multiplexer and the second multiplexer via a command line.

16. A mobile computing device comprising;

a first port comprising a first pinout that is configured to support a portable digital media interface and a second pinout to support a high-definition multimedia interface;

a plurality of data sources that are each configured to provide data in a data format, wherein a bias is selectively asserted on a first pin of the first port to facilitate selecting the data format to transmit to the first port from one of the plurality of data sources;

a first multiplexer configured to selectively transmit data from a first data source of the one of the plurality of data sources;

a second multiplexer configured to selectively transmit data from a second data source of the one of the plurality of data sources and the first multiplexer; and a hardware sensor coupled to the first multiplexer and the second multiplexer via a command line and coupled to the first port via a sensing line, wherein the hardware sensor is configured to:

detect, via the sensing line, the pinout associated with the first port; and transmit, directly via the command line, commands to the first multiplexer and the second multiplexer to selectively transmit data from the one of the plurality of data sources to the first port, wherein the pinout is reconfigured to support the selected data format.

17. The device in accordance with claim 16, wherein the first multiplexer and second multiplexer transmit data in a first data format when a first bias is asserted on a first pin and transmits data in a second data format when a second bias is asserted on the first pin.

18. The device in accordance with claim 17, wherein the first bias comprises a ground applied to the first pin and the second bias comprises a non-zero voltage asserted on the first pin.

19. The device in accordance with claim 18, wherein the non-zero voltage is supplied to the first pin of the first port.

20. The device in accordance with claim 16, wherein a default data format is selected when a bias is not asserted on a first pin.

* * * * *

UNITED STATES PATENT AND TRADEMARK OFFICE
CERTIFICATE OF CORRECTION

PATENT NO. : 10,366,042 B2
APPLICATION NO. : 15/832165
DATED : July 30, 2019
INVENTOR(S) : Wynn Page 1 of 1

It is certified that error appears in the above-identified patent and that said Letters Patent is hereby corrected as shown below:

In the Claims

In Column 8, Line 37, Claim 3, delete "PDMI" and insert therefor -- HDMI --.

Signed and Sealed this
Fifth Day of November, 2019

Andrei Iancu
*Director of the United States Patent and Trademark Office*